July 29, 1930.  O. E. LONGTIN  1,771,412
BROODER AND HEATING MEANS THEREOF
Filed Feb. 26, 1927
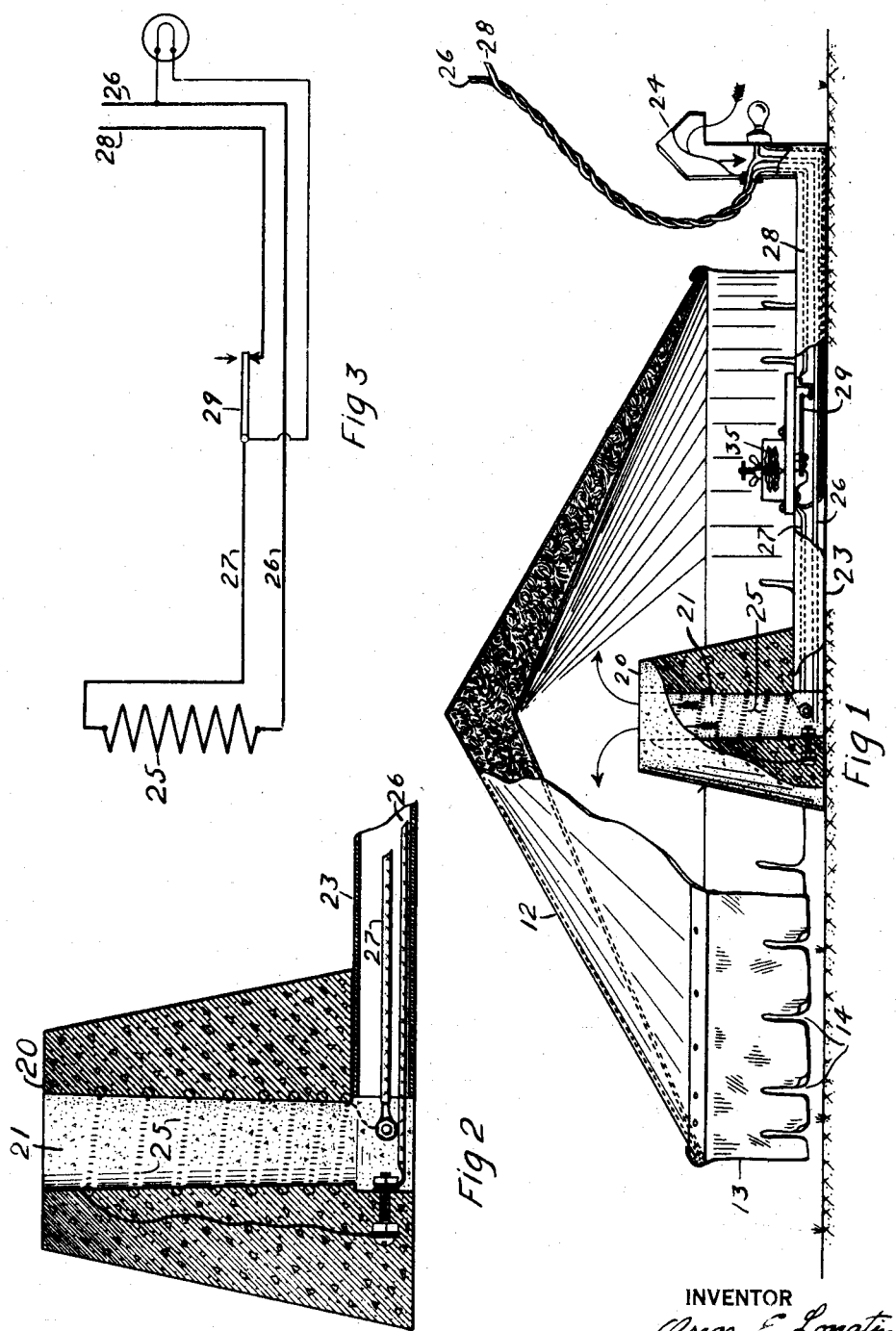
INVENTOR
BY Oscar E. Longtin
ATTORNEY Patented July 29, 1930

1,771,412

UNITED STATES PATENT OFFICE

OSCAR E. LONGTIN, OF FRESNO, CALIFORNIA

BROODER AND HEATING MEANS THEREOF

Application filed February 26, 1927. Serial No. 171,280.

My invention relates to an electrically heated brooder and it has for its prime object the provision of an improved heat storage heating element which will, in the event the electricity is cut off unexpectedly, or fails for any reason, radiate the heat therein stored for a considerable period of time and also being so constructed, that when used in combination with a suitable thermostat, a uniform temperature will be maintained under the hover.

In all electrically heated brooders using heat storage elements, as far as I am aware, the temperature under the hover varies within wide limits and therefore have not been satisfactory in practical use. This variation in temperature is mainly due to the resistance wire being wholly embedded in the heat storing material of which the heating element is constructed thereby introducing a long time interval or lag between the switching on and off of the current by the thermostat.

A further object is to provide means controlled by the heated atmosphere within the brooder for automatically regulating the supply of energy to the heating elements, whereby the temperature may be maintained at a predetermined point.

A still further object is to provide means for providing a continuous supply of heated fresh air into the brooder.

Other objects and advantages will appear hereinafter and while I have shown and will describe the preferred form of my invention, I wish it understood that I do not limit myself to such preferred form, but that various changes and adaptions may be made therein without departing from the spirit of my invention.

In the drawings accompanying and forming a part hereof,

Fig. 1 is a side elevation of a brooder constructed according to my invention, partly broken away.

Fig. 2 is an enlarged detail view of a heating element as used in my device.

Fig. 3 is a wiring diagram of my device.

Referring to the drawings, my brooder comprises a cone shaped body 12 provided around its lower open edge with a downwardly depending curtain 13 which curtain is provided with spaced apertures 14 around its lower edge, which provide ingress and egress for the chicks when the brooder is at its lowest position. Body 12 is supported above the ground or floor in any suitable or desired manner which will permit of raising or lowering the same as desired.

My heating element comprises a body member 20 which is formed of concrete or other hardened plastic material, and is substantially circular in top plan and decreases in size from the bottom to the top. Provided centrally of member 20, to extend vertically therethrough, is an aperture 21, and mounted in the lower end of member 20 is one end of a fresh air duct 23 in communication with aperture 21. Duct 23 extends along the ground to a point just outside of body 12 and then extends upwardly at a right angle and supports upon its upper end a bonnet or hood 24. Partly embedded in the walls of aperture 21 is a heating coil 25 the ends of which are connected by wires 26 and 27 to one side of a switch 29 mounted within duct 23. The other side of switch 29 is connected by wires 26 and 28 to a source of energy supply (not shown). A thermostat 35 controls the opening and closing of switch 29 and extends upwardly into the brooder.

In the operation of my brooder the thermostat will be adjusted to expand at the desired temperature. Wires 26 and 28 will then be connected to a source of energy through a suitable attachment plug (not shown) to complete the circuit through coil 25 and heat the same. As coil 25 becomes heated the air within aperture 21 will be heated and rise upwardly, thereby creating a draft or current of fresh air through pipe or duct 23. Hood 24 is provided to prevent foreign substances from entering the open end of duct 23. Part of the heat generated by coil 25 will be absorbed by body 20 and in turn radiated into the brooder. Should the electricity be cut off accidentally the heat stored up in body member 20 will serve by radiation to heat the brooder for a considerable length of time, thereby preventing injury to the birds.

Having described my invention, what I claim is:

A heating element for brooders, comprising a block formed of concrete or other hardened plastic material; an aperture extending upwardly through said block; a heating coil mounted within said aperture and being partially embedded within the walls thereof, whereby a considerable portion of the heat generated by said heating coil is stored up in said block.

In witness that I claim the foregoing I have hereunto set my hand this 19th day of February, 1927.

OSCAR E. LONGTIN.